United States Patent [19]

Shiraki et al.

[11] Patent Number: 5,079,724
[45] Date of Patent: Jan. 7, 1992

[54] WORD PROCESSING APPARATUS HAVING IMAGE-FORMAT CONTROL FUNCTIONS

[75] Inventors: Tatsuya Shiraki, Nara-ken; Makoto Kado, Yamatokoriyama, both of Japan

[73] Assignee: Sharp Kabushiki Kaisha, Osaka, Japan

[21] Appl. No.: 412,881

[22] Filed: Sep. 26, 1989

[30] Foreign Application Priority Data

Sep. 30, 1988 [JP] Japan ................................ 63-247747

[51] Int. Cl.$^5$ ............................................... G06F 3/14
[52] U.S. Cl. ...................................... 395/146; 340/731
[58] Field of Search ............... 364/518, 521, 523, 519, 364/520; 382/47; 340/721, 734, 731

[56] References Cited

U.S. PATENT DOCUMENTS

| | | | |
|---|---|---|---|
| 4,366,475 | 12/1982 | Kishi et al. | 364/521 X |
| 4,533,910 | 8/1985 | Sueonick et al. | 364/521 X |
| 4,686,580 | 8/1987 | Kato et al. | 382/47 X |
| 4,823,303 | 4/1989 | Terasawa | 364/523 X |
| 4,942,619 | 7/1990 | Takagi | 382/47 |

*Primary Examiner*—David L. Clark
*Attorney, Agent, or Firm*—Cohen, Pontani & Lieberman

[57] ABSTRACT

A word processing apparatus with a function of an image-format control includes an image data storage for storing image data imputted in a certain format, an reading unit for reading the image data from the image data storage, a display device for displaying a region on a screen, a magnification/reduction control unit for calculating a virtual print size of the read image data, comparing the virtual print size with the size of the region, and magnifying or reducing the size of the read image data when those compared sizes are not equal so as to put the image within the region.

8 Claims, 7 Drawing Sheets

WORD PROCESSING APPARATUS HAVING IMAGE-FORMAT CONTROL FUNCTIONS

BACKGROUND OF THE INVENTION (1) Field of the Invention

The present invention relates to a word processing apparatus with a frame editing function and, more specifically, relates to a word processing apparatus with a function of image-format control, which regulates a size of image data read from a memory and transfers the processed data to an output device.

(2) Description of the Prior Art

Conventionally, in a word processing apparatus such as a desk word processor having a liquid crystal display, in instances where the word processor prints an image which has been edited by another word processor, the following disadvantage is caused; if the word processor which practiced the frame editing of the image data employs a print dot pitch different from that of the processor which is to print the image data, an image printed out is changed in size i.e., the ratio of the dimensions has changed and the image may appear distorted. When the image edited with the another processor extends beyond a region defined by a frame which is specified in the personal word processor, an operator must reduce the image manually within accommodate it to the specified frame.

Accordingly, a conventional word processor can not use an image made with another word processor having a different print dot pitch, without modifications. Therefore, a great deal of work is required for modifying the image.

Japanese Patent Publication No. 31375/1987 titled "a fair copy processing apparatus" discloses an apparatus which may change a format such as the character number in a character line to justify line width, re-edit text data based upon the changed format and output it to a printer. In the above apparatus, however, a process for creating a new line accompanies a change in an arrangement of character lines which makes up a text. Accordingly, the apparatus is useless in instances where a mixed or non-text (graphic image is involved, since the rate of the lateral/longitudinal length of an inputted image must be equal to the rate of the lateral/longitudinal length of an image to be printed. In other words, the apparatus can not be applied to processing of image data.

SUMMARY OF THE INVENTION

The present invention provides a word processing apparatus with the ability to control the formatting of an image, capable of printing image data inputted with another word processing apparatus whose print dot pitch is different from that of the personal word processing apparatus, the rate of the lateral and longitudinal length of the image, and printing the stored image data.

The word processing apparatus according to the present invention comprises: image data storage means for storing image data inputted in a certain format, input means for inputting read instruction to read the image data, reading means for reading the image data from the image data storage means in response to the read instruction from the input means, and virtual print size calculating means for calculating the data amount of the image data on the basis of the format applied to the image data read from the image data storage means and for calculating a virtual print size on the basis of the calculated data amount of the image data, second input means setting a region for the image, display means for displaying the region set by the second input means, region size calculating means for calculating the size of the region displayed by the display means, comparison means for comparing the region size calculated by the region size calculation means with the virtual image data print size calculated by the virtual print size calculation means, magnification/reduction rate calculation means for calculating the rate of the region size to the virtual image data print size when those two sizes are not equal in the result of the comparison practiced by the comparison means, and for calculating an image data magnification/reduction rate on the basis of the rate to accommodate the image data to the region, and magnification/reduction means for magnifying or reducing the size of the image data read by the reading means to put the image data within the region.

Herein, the term "format" stands for editorial information including a print dot pitch. "Data amount" means the number of dots for representing image data.

A keyboard is preferably used as the input means and the second input means but a pointing device such as a tablet input device or a mouse may be also used. The image data storage means may be an auxiliary storage means such as a hard disc or a floppy disc.

The reading means, virtual print size calculation means, region size calculation means, comparison means, magnification/reduction rate calculation means and magnification/reduction means may be a self-contained CPU of the word processing apparatus. The display means may be a dot matrix type display device such as a CRT, LCD or LED.

A word processing apparatus described herein generally refers to an apparatus including an input unit for inputting character and image data, a memory unit for storing various input data, an editing unit for editing various data and a display unit for displaying the edited result and, specifically, it may be a word processor, a computer capable of processing character and image data or the like.

In accordance with the present invention, after image data inputted in a certain format is read, a virtual print size of the image data is calculated. Then, it is judged whether or not the virtual image data print size is equal to the size of a region set by an operator. If the result of such a judgement is that they are not equal, the read image is magnified or reduced to be accommodated within to the region.

In accordance with the present invention, even if a print dot pitch of the image data read from an image data storage means is different from that of a personal word processing apparatus which prints the read image data in practice, the read image data is automatically magnified or reduced to fit in the region, whereby the read image data can be used in the personal word processing apparatus without manual modification. Thus, work efficiency in editing the image data can be considerably improved.

BRIEF DESCRIPTION OF THE DRAWINGS

An embodiment of the invention will now be described by way of example and with reference to the accompanying drawings, in which.

DESCRIPTION OF THE PREFERRED EMBODIMENTS

Figure 1:
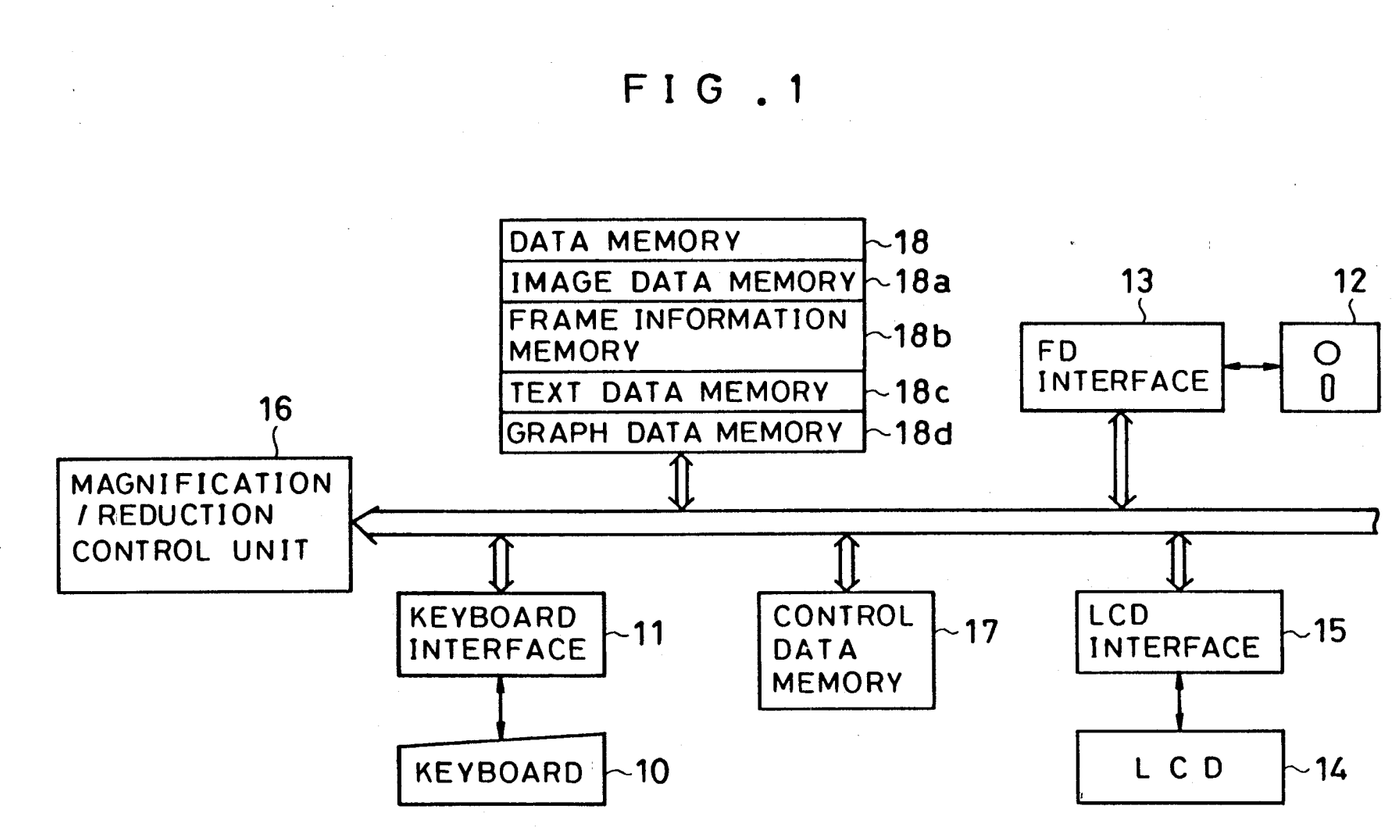
FIG. 1 is a block diagram illustrating an a flow chart of a preferred embodiment of a word processing apparatus according to the present invention.

FIG. 1 is a block diagram illustrating a flow chart of an embodiment of a word processor according to the present invention. In FIG. 1, a keyboard 10 is used as input means for inputting character and image data and further inputting various instructions, for example, to read the image data. Reference numeral 11 denotes a keyboard interface. An external storage 12 such as a floppy disc (referred to as FD below) is used as an image data storage means. Reference numeral 13 is a FD interface. A display 14 is a liquid crystal display (LCD). Reference numeral 15 is an LCD interface.

Figure 2:
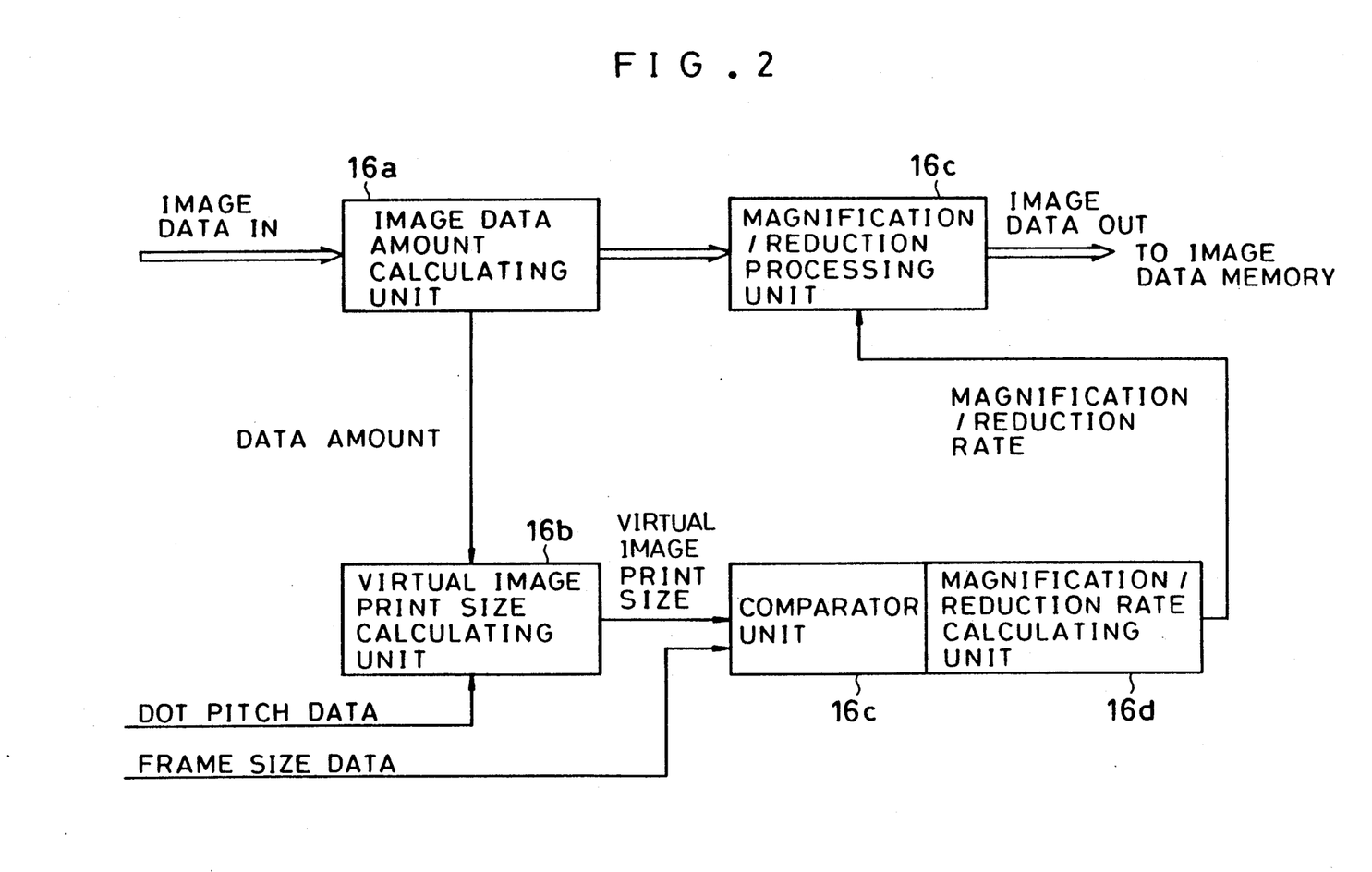
FIG. 2 is a block diagram illustrating a flow chart of the magnification/reduction control unit shown in FIG. 1.

A magnification/reduction control unit 16 is a main processing unit in this embodiment. The magnification/reduction control unit 16 has an architecture consisting of elements shown in FIG. 2 and executes, in accordance with a program stored in a control data memory 17, the following process of: (1) reading image data inputted in a certain format, (2) calculating the data amount of the image data on the basis of the format applied thereto through an image data amount calculating unit 16a, based upon the size of the region and print dot pitch (3) calculating a virtual print size of image data from the data amount given at step (2) through an image print size calculating unit 16b, (4) calculating a size of a region set on a display screen (a frame size), (5) comparing the region size with the virtual image data print size through a comparator unit 16c, (6) if, as a result of the comparison, the region size does not correspond to the virtual image data print size, calculating the rate of the region size to the virtual image data print size and further calculating the magnification/reduction rate of the image data on the basis of the rate given by the previous calculation for accommodating the image data to the region, through a magnification/reduction rate calculating unit 16d, and (7) magnifying or reducing the the image data in accordance with the calculated magnification or reduction rate and displaying the magnified or reduced image data within the region set on the display screen, through the magnification/ reduction processing unit 16c.

A data memory 18 is a RAM consisting of an image data memory 18a, a frame information memory 18b, a text data memory 18c and a graph data memory 18d. The data memory 18 stores various information outputted from the magnification/reduction control unit 16.

Figure 3A:
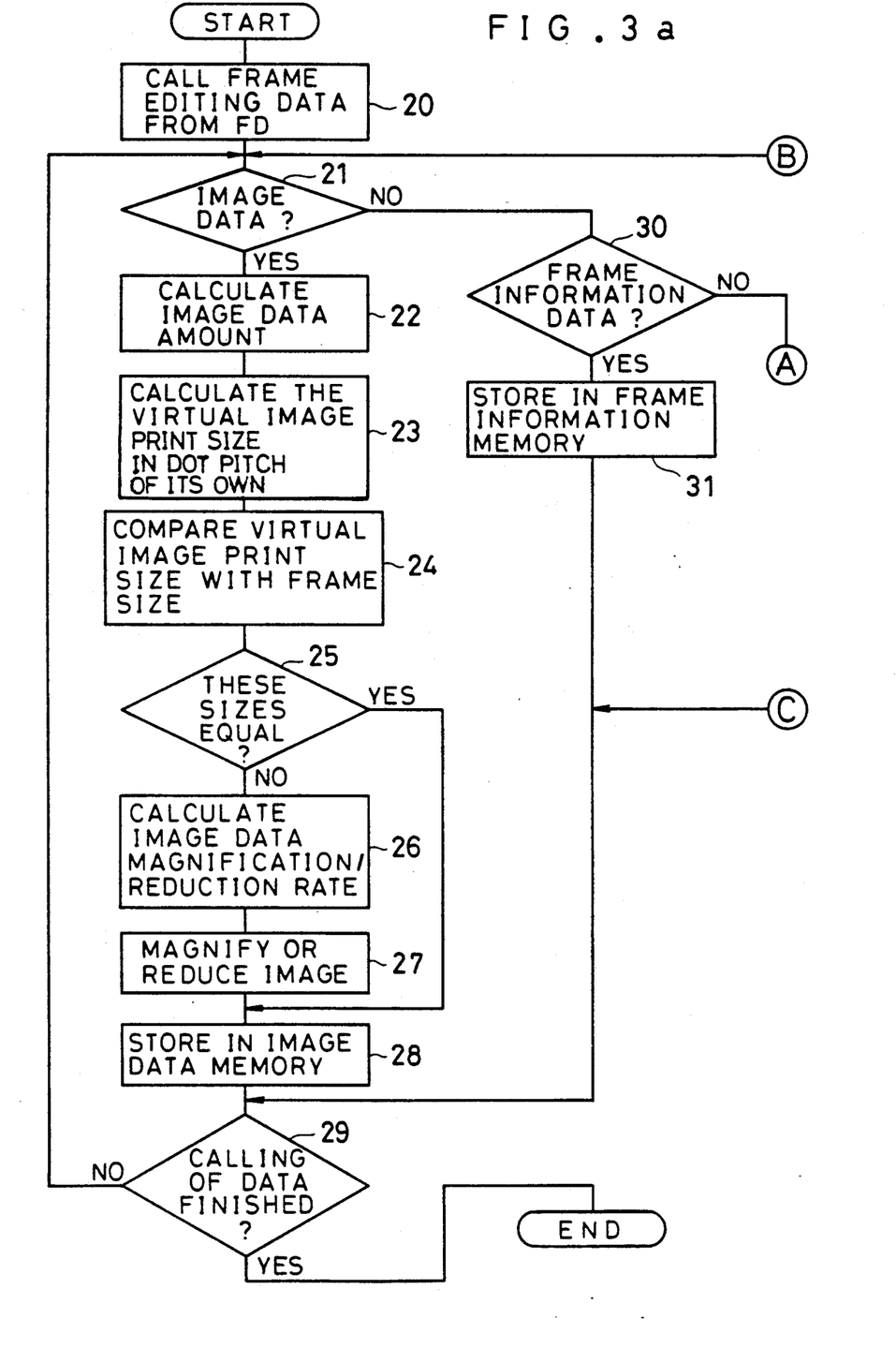
FIG. 3a and 3b comprise a flow chart illustrating the operation, of the preferred embodiment.
Figure 3B:
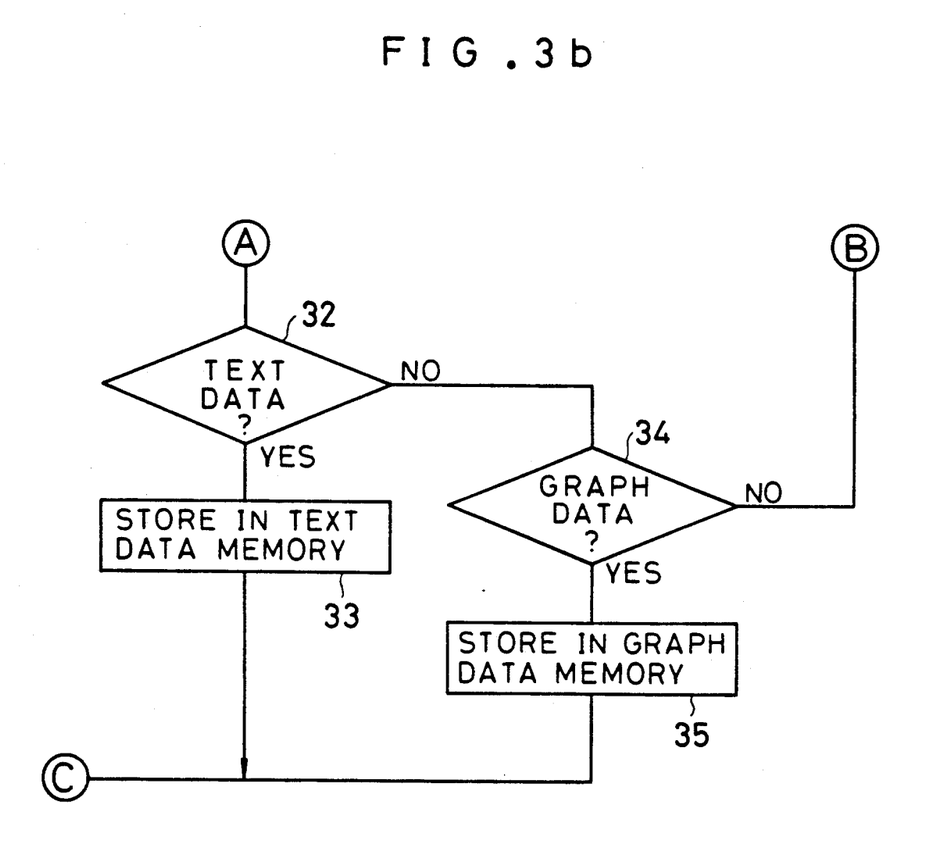

The operation of the embodiment will now be described with reference to the flow chart in FIG. 3.

First, an instruction to read data is applied from the keyboard 10 to call frame editing data from the FD 12 (step 20), and then it is judged whether the called data is image data or not (step 21). If the result is YES, the data amount of the image data is calculated (step 22) and then a virtual print size of the image data is calculated in a dot pitch of its own word processor (step 23). Then, the virtual image print size is compared with the frame size (step 24), and equality of these two sizes is judged (step 25). As a result of the judgment, if they are not equal, magnification or reduction rate for the image data is calculated to accommodate the image data within the prescribed frame (step 26). Subsequently the image is magnified or reduced on the basis of the calculated magnification or reduction rate (step 27), and then the result of the magnifying or reducing process is updated in the image data memory (step 28). Then, it is judged whether calling of the data is finished (step 29). If the result is YES, the process ends, but if the result is NO, the process returns to step 21.

If the called data is not image data at step 21, it is judged whether or not it is frame information (step 30). If the result is YES, the frame information is stored in the frame information memory 18b (step 31). If the decision at the step 30 is NO, as shown in FIG. 3(b), it is judged whether or not the called data is text data (step 32). If the result is YES, the text data is stored in the text data memory 18c (step 33). If the decision at the step 32 is NO, as shown in FIG. 3(c) it is further judged whether or not the called data is graph data (step 34). If the result is YES, the graph data is stored in the graph data memory 18d (step 35). Incidentally, if the decision at the step 34 is NO, the process returns to step 21.

Figure 4:
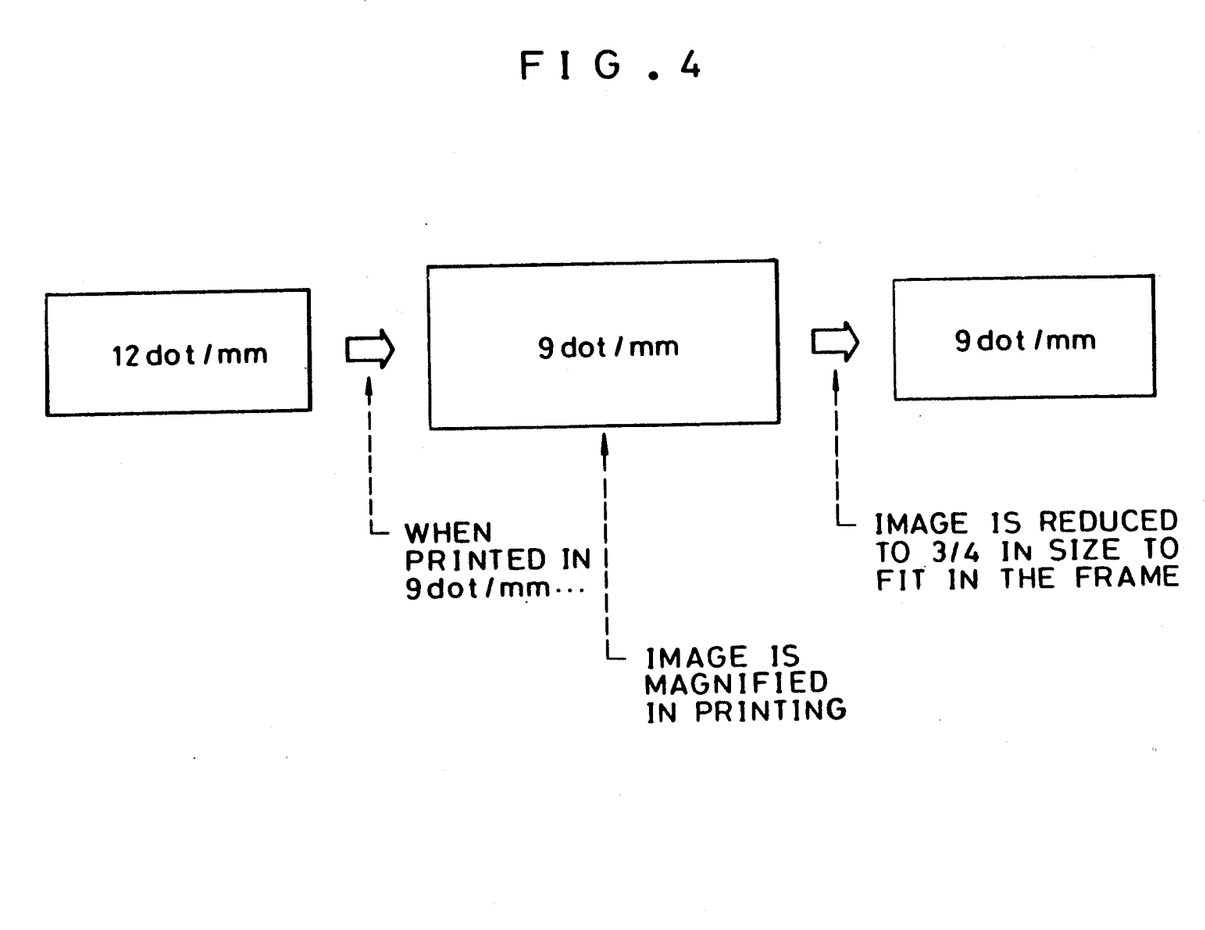
FIG. 4 is a diagram presented for explaining an image data magnifying/reducing process in the preferred embodiment.

FIG. 4 is a diagram presented for explaining an example of the above mentioned process. In instances where the image called from FD 12 is a 30×60 mm image made with another word processor which prints in a dot pitch of 12 dot/mm, if printed with the word processor of this embodiment in 9 dot/mm dot pitch, the image is to be magnified into an approximately 40×80 mm image according to the virtual image print size calculating unit 16b. The comparator unit 16c compares the frame size 30×60 mm with the virtual image size 40×80 mm, and the magnification/reduction rate calculating unit 16d determines a reduction rate as ¾ on the basis of the result of the calculation. Then the image is reduced by the magnification/ reduction processing unit 16d to fit in the frame.

The aforementioned reduction process will be explained in detail with an example of the image data.

Figure 5:
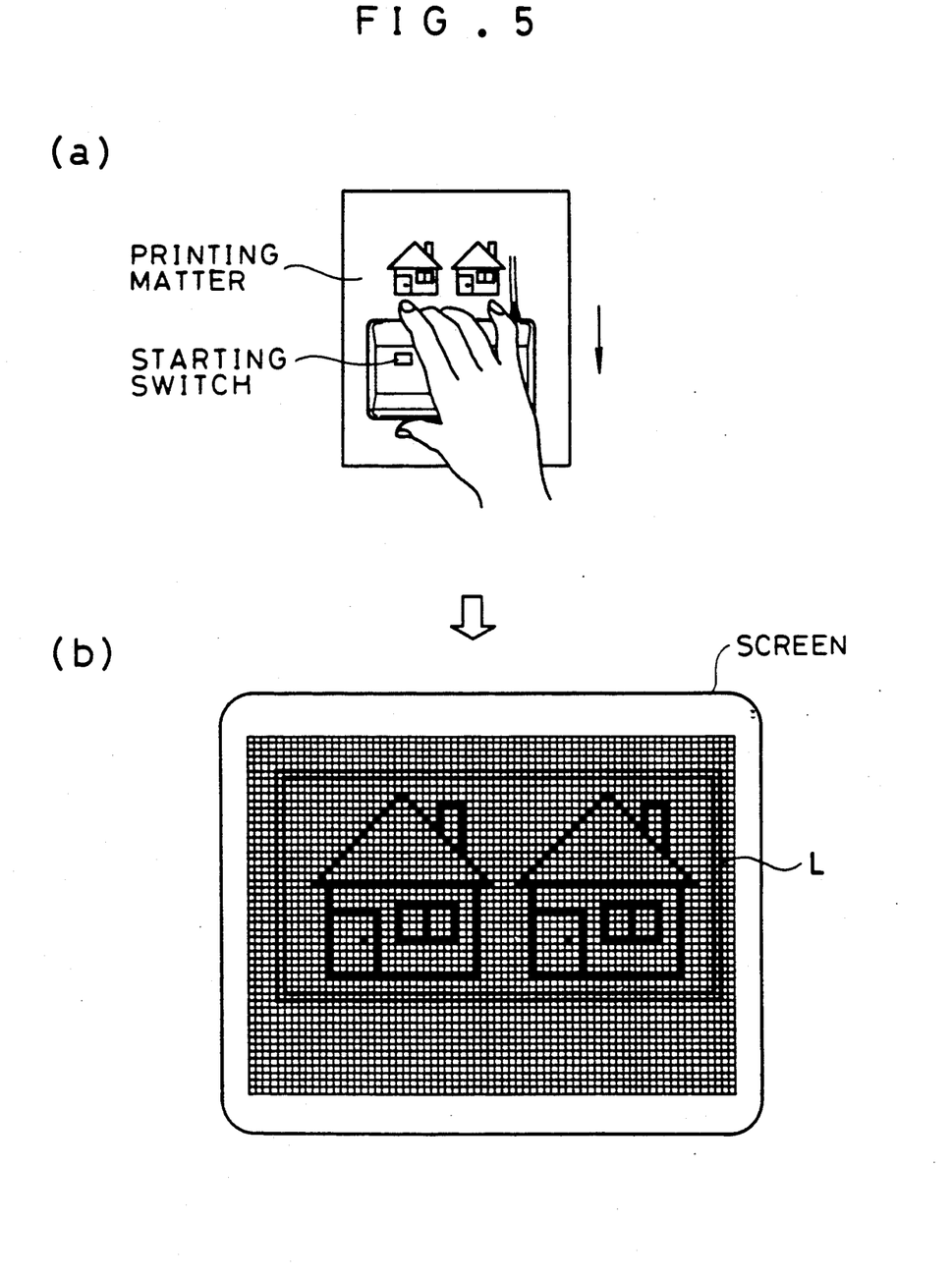
FIGS. 5a, 5b, 6a, 6b and 6c are diagrams presented for specifically explaining the image data magnifying/ reducing process in the preferred embodiment.

FIG. 5 (a) illustrates a situation in which an image is read from a printing matter using an image scanner.

Figure 6A:
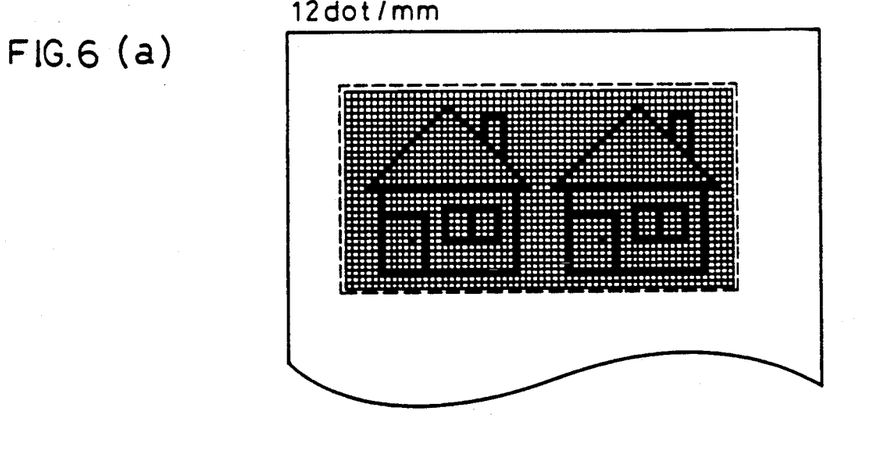

FIG. 5 (b) illustrates a screen of the LCD 14 on which the image read from the printing matter is presented. A double line L on the screen is a boundary for specifying a frame covering a range necessary for printing, which is drawn by operating the keyboard 10. If the word processing apparatus takes the image data in a print dot pitch of 12 dot/mm and a frame size of 30×60 mm is specified for the image, the resultant image to be extracted is 360×720 dot/mm in size. FIG. 6 (a) illustrates the resultant image.

Figure 6B:
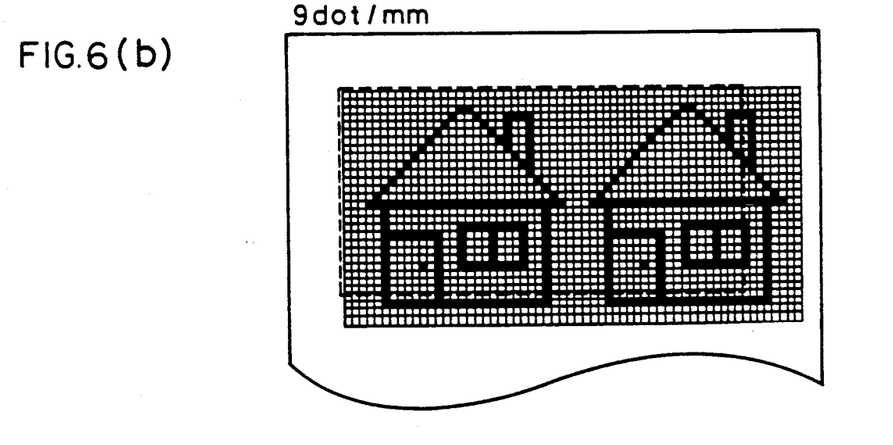

Next, the virtual image print size is calculated to be printed with a word processing apparatus of a print dot pitch of 9 dot/mm. A size M of the virtual print image is given by $360/9 \times 720/9 = 40 \times 80$ mm [see FIG. 6 (b)], and the image extends beyond the frame of 30×60 mm. Accordingly, it is necessary that the image size of 40×80 mm be reduced to 30×60 mm.

Figure 6C:
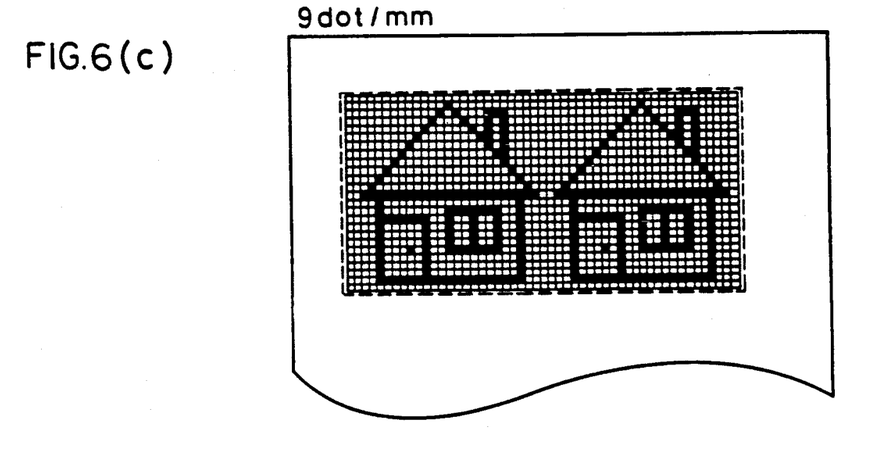

The required reduction rate N is $30/40 = 60/80 = \frac{3}{4}$. Thus, the image is reduced with the reduction rate ¾; namely, the image size is reduced to 270×540 dot, whereby the image read from the printing matter can be put in the range of the specified size 30 ×60 mm with an appropriate rate even if the image is printed using the word processor of 9 dot/mm print dot pitch type [see FIG. 6 (d)].

As to a dot thinning-out process by which an image made in 360×720 dot is reduced to an image of 270×540 dot, the explanation is omitted because the known art can be utilized for practicing it.

What is claimed is:

1. A word processing apparatus having image-format control functions for the storing, calculating and manipulating of inputted image data, comprising:
    image data storage means for storing inputted image data on a basis of both a first dot pitch and a first region size that together reflect the appearance of an image,
    image data editing means connectable to said image data storage means for editing said image data on a basis of a second dot pitch and a second region size that together reflect parameters of a region in a display means,
    input means for inputting a read instruction to read said image data,
    reading means, responsive to said read instruction from said input means, for reading said image data from said image data storage means,
    virtual print size calculating means for calculating a first virtual size on the basis of said first dot pitch and said first region size and a second virtual size on the basis of said second dot pitch and said second region size,
    comparison means for comparing said first virtual size and said second virtual size,
    magnification/reduction rate calculating means operatively connected to said comparison means and engaged when said first and second virtual sizes are determined by said comparison means to be unequal, for calculating a ration of said first virtual size to said second virtual size, and for calculating an image data magnification/reduction rate on the basis said ratio to accommodate said image within the parameters of said region in said display means, and
    magnification/reduction means operatively connected to said magnification/reduction rate calculating means for receiving said ratio and for magnifying or reducing the size of said image data to position said image within the parameters of said region in said display means.

2. An apparatus according to claim 1, wherein data storage means is an auxiliary storage device.

3. The device according to claim 2, wherein said auxiliary storage device is a magnetic storage medium.

4. The device according to claim 1, further comprising reading means for reading an image and determining said first print dot pitch and said first region size.

5. The device according to claim 4, wherein said reading means comprises a scanner.

6. The device according to claim 1, wherein said display means is a computer screen.

7. The device according to claim 1, wherein said display means is paper.

8. A method of storing, calculating and manipulating an image-format in a word processing apparatus, comprising the steps of:
    reading image data on a basis of both a first dot pitch and a first region size that together reflect the appearance of an image,
    calculating a first virtual image data size on a basis of said first dot pitch and said first region size,
    setting a region on a display means,
    calculating a second virtual image data size on a basis of a second dot pitch and a second region size corresponding with the size of said region,
    comparing said first virtual image data size with said second virtual image data size,
    calculating a ratio of said first virtual image data size to said second virtual image data size when said first and second virtual image data sizes are determined to be unequal as a result of said comparing, and further calculating an image data magnification/reduction rate on a basis of said ratio to accommodate said image within said region of said display means.

* * * * *